United States Patent Office 2,894,251
Patented July 7, 1959

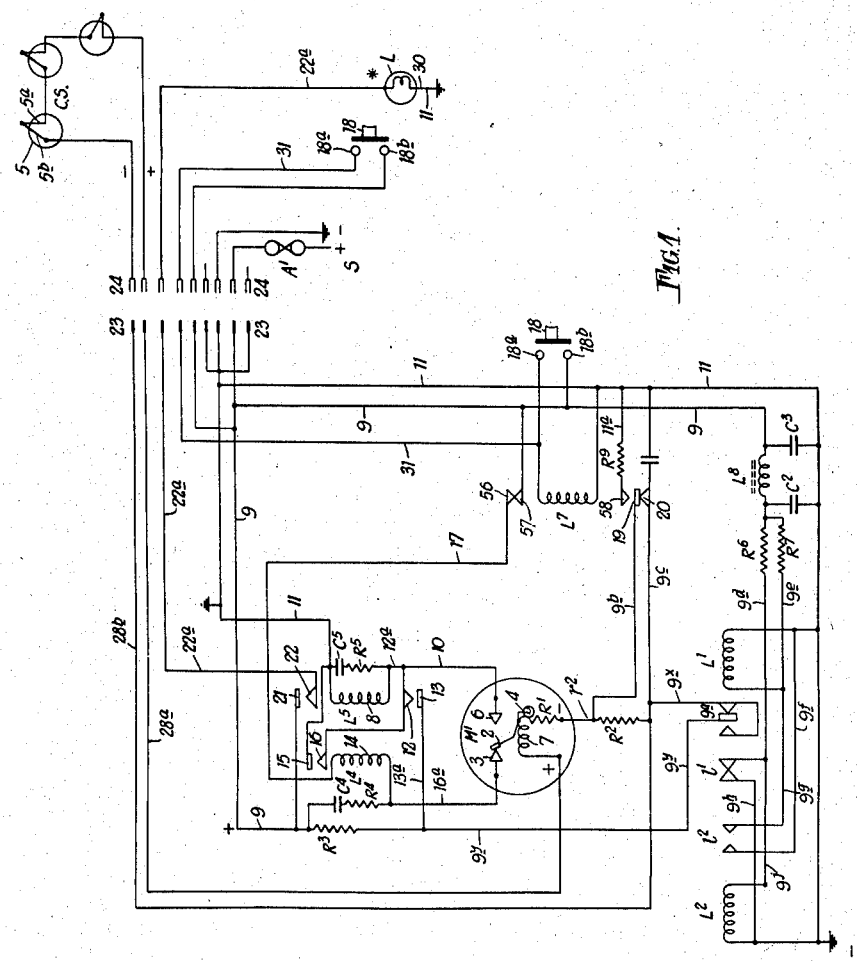

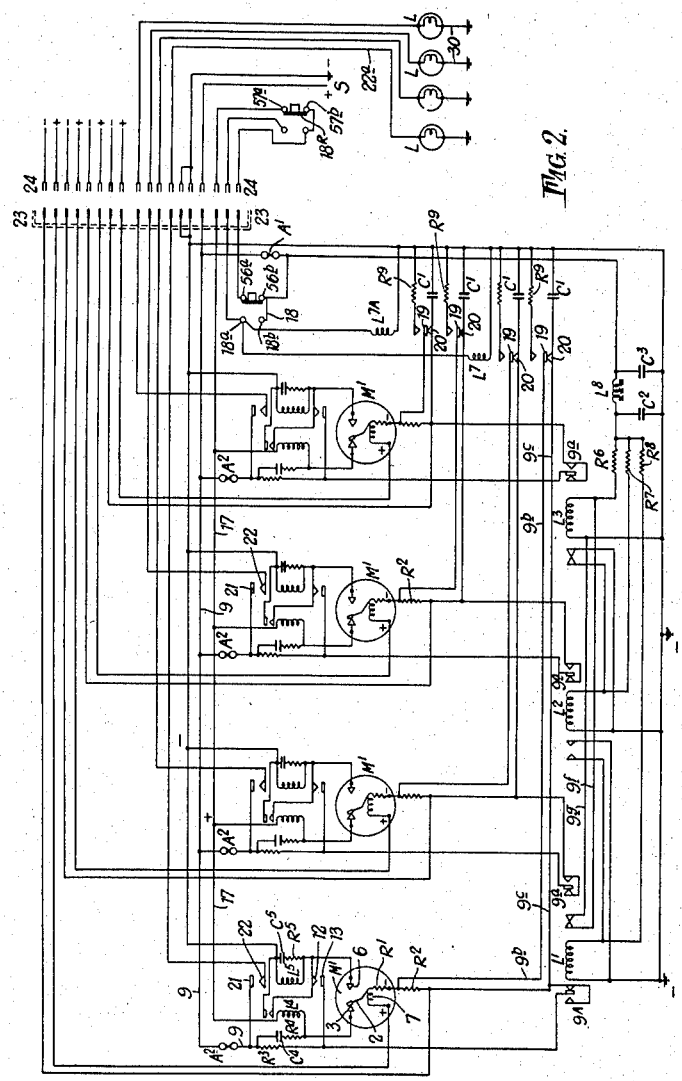

2,894,251

TEMPERATURE CHANGE RESPONSIVE MEANS FOR CONTROLLING ELECTRIC CIRCUITS

William Harry Ruffle, Hove, England, assignor to Speed Development Company Limited, Hove, England Application October 11, 1955, Serial No. 539,909

Claims priority, application Great Britain October 18, 1954

4 Claims. (Cl. 340—227)

This invention relates to improvements in and modifications of the invention described in Patent No. 2,589,869 which more particularly is concerned with apparatus for giving a signal when there is a sudden change in temperature in, or in the vicinity of a power unit or other suitable unit susceptible to variations in temperature and for example is useful on aircraft for giving a warning to the pilot or crew in the event of a fire, or above normal rate of rise in temperature occurring. The present invention in common with that of Patent No. 2,589,869 is suitable for use with modern aircraft having jet or turbo-jet engines, gas turbines and other high power engines where for some time it has been found desirable to be able to distribute about the power unit at a plurality of vulnerable points devices common to a single warning apparatus and which devices can be activated practically spontaneously independently of each other or collectively to develop a low E.M.F. to initiate the operation of electrical apparatus functioning to give a warning when there is a distinct sudden rise in temperature as distinct from a smooth progressive rise at or below a predetermined rate, e.g. as when fire breaks out at a vulnerable point, whilst obviating risk of a false warning when conditions are normal.

In Patent No. 2,589,869 there is proposed electrically operated apparatus for bringing into operation by reason of a sudden increase in temperature at a control source a warning or other electrically actuated device, and which comprises in combination with one or more of said devices a very sensitive relay operable by the said low E.M.F., an electrically operated warning or other electrically operated device operated from a source of electrical energy having a much greater output than said low E.M.F., a holding circuit for the said device, normally inoperative means controlled by the actuation of said relay to connect said electrically operated warning or other device effectively to said higher E.M.F. source whilst transferring the electrical load from said relay to said holding circuit, a test circuit with means to bring it selectively into operation, and means adapted upon bringing in the test circuit to introduce into the circuit of the said low E.M.F. producing means an E.M.F. substantially equal to the operative output of the said latter circuit.

The foregoing apparatus of Patent No. 2,589,869 in one practical form as already adopted for some time on aircraft comprises a switch with an actuating means operable by an E.M.F. of a few milli-volts, means responsive to sudden temperature change to produce a very low E.M.F. of a few milli-volts and connected to said actuating means of the switch to actuate the switch, the electrically operated warning or other device being adapted to be actuated from an operative source of electrical energy having a much greater E.M.F. output than the said means, a holding circuit for the said warning or other device normally inoperative, a double wound relay having one winding controlled by the actuation of said switch due to sudden temperature change to connect effectively said electrically actuated device to said operative source whilst transferring the load due to the controlling of said one winding from said switch to said holding circuit, pulsating relay means regularly interrupting the current supply to the switch contacts, a resistor in series with the connections from said low E.M.F. producing means to the said actuating means of the switch and in series with said operative source and the switch contacts to produce splitting of the current flowing to the said resistor from said operative source so that part flows through the resistor and part through said low E.M.F. producing means to feed from said higher E.M.F. source an assisting E.M.F. into the switch actuating means when the switch is actuated to assist in ensuring the bringing in of the said warning or other device, a resistor connected across said one winding adapted to reduce the current flow through the winding, a release circuit adapted to feed an assisting E.M.F. into the switch when the switch is returned to normal to assist in maintaining it in its normal position and including the other winding of the said double wound relay, contacts operated by said two windings, the contacts of the first mentioned winding being closed to bring in the said holding circuit and the said device, the contacts of the winding of the release circuit completing the circuit through such release circuit winding to said operative source via the switch and both of said resistors and a resistance in the supply to the first mentioned winding by which the voltage applied to the second mentioned or release circuit winding is greater than that applied to the first mentioned winding.

Consideration of the apparatus of Patent No. 2,589,869 as just described will show that the aforesaid single "double-wound" relay has only one armature and having regard to the great importance of having all of the contacts so related as to make and break at the precise critical moment such an arrangement was found to call for extremely accurate adjustment and also required watching and testing over a protracted period before fitting the apparatus for use. Also it has been found that the aforesaid milli-volt switch (which actually is of the type in which the moving very thin and narrow blade contact is biased by a fine coiled hair spring of the construction normally associated with delicate galvanometers) when employed in the manner described frequently has its contacts burned by arcing owing to the frequent necessity of having to make a succession of operations before releasing the sub-master part of the "double-wound" relay.

Still further in the apparatus of Patent No. 2,589,869 the aforesaid pulsing relay means employed only ordinary, i.e. one fixed and one moving, make and break contacts which unavoidably means exceptionally short make periods for the supply of current to said milli-volt switch, and also should failure occur in the pulse circuit and the appropriate relay thereof is energised when such condition arises, there is risk of the pair of contacts maintaining disconnection between the source of electrical energy and the milli-volt switch so that no warning can be given. Also it has been found with the said earlier apparatus radio interference and possibility of false warning signals being given arose out of the avoidance of "change-over" contacts being employed with at least two of the relays of the circuit. By "change-over" contacts is, of course, meant two spaced contacts connected to one pole of a common source and a moving intermediate contact connected to the other pole and to the appropriate part of the apparatus.

In addition it has been found that in the aforesaid apparatus the test circuit thereof should include contact means which cannot become high resistive or "open circuit" as otherwise a false warning might be given. The present invention solves this problem and also overcomes the foregoing disadvantages.

With the foregoing in mind, according to the present invention apparatus for giving a signal of a sudden change in temperature in, or in the vicinity of a power unit or other apparatus susceptible to variations in temperature, employs in common with the apparatus of Patent No. 2,589,869 a very sensitive moving coil switch or relay having a pair of contacts one of which is engaged by a moving contact in the normal position of the switch and the other of which is engaged by said moving contact when the coil is energised, a thermo-couple type of detector for detecting the sudden change of temperature having a connection to said moving coil switch to operate the switch and consisting preferably of two similar metal (preferably wire) elements connected at opposite ends to a dissimilar metal element to provide two spaced points of generation of a very low E.M.F. the two points being exposed identically to normal ambient temperature but one being shrouded partially to access of flame so that the other becomes hotter than the shrouded one when flame impinges on the detector. That is to say one works in opposition to the other and both are exposed to the influence of the immediately ambient temperature conditions but one being more exposed than the other so that with normal slow temperature variations the voltage output is insufficient to operate effectively the milli-volt switch or sensitive moving coil relay but with a rapid rise in temperature, as in the event of outbreak of fire in close proximity to the detector, the said more exposed couple responding to the temperature rise before the inner couple to cause a voltage generation sufficient to operate effectively the milli-volt switch or sensitive moving coil relay, a warning or other device electrically operated and supplied with electrical energy from a normal source. However, instead of a single "double-wound" relay the apparatus of the present invention uses a pair of miniature relays one of which comprises a master relay having its own holding circuit and which master relay when energised operates to bring into circuit the warning or other device, the other miniature relay (i.e. sub-master relay) when energised, effecting the release and cancellation of the warning by shorting the master relay, the master relay being energised from the said normal source initially via contacts of the said moving coil switch. Also as in the apparatus of Patent No. 2,589,869 the present invention includes a push-button or other suitably selectively operated test circuit, and in the present invention this test circuit includes means to isolate the said sub-master miniature relay from the source of electrical energy until the said master relay has functioned, a release circuit including the said sub-master miniature relay and associated contacts, which latter contacts, when the moving coil switch is returned to normal, connect the winding of their relay to said normal source and thereby short circuits the said master relay to release and thus to isolate the moving coil of the switch from said normal source. Likewise, as an integer of a combination of integers combined to make up the apparatus of the present invention there is included means to feed from said normal source into the moving coil circuit an E.M.F. assisting in the maintenance of the engagement of the appropriate contacts of the moving coil relay, and a pulse circuit regularly interrupting the assisting E.M.F.

The advantage of using two miniature relays instead of two release windings on a common core has already been described but it should now also be mentioned that in the earlier apparatus relays which provide a pulse circuit were liable to cause failure due to foreign matter getting in their contacts and the present invention by using change-over contacts with the pulse circuit relay remedies this. Also it is necessary to counteract radio interference, obviate risk of all circuits in a multi-engine warning set failing in the event of a single fuse blowing, obviate sparking in the sensitive relays fed from the thermo-couples or other detectors and generally to lighten and increase the efficiency of the apparatus.

Figure 1 is a diagrammatic view showing the invention as adapted for use with a single control source, and Figure 2 is a diagrammatic view showing the invention as adapted for use with a plurality of control sources.

Referring to Figure 1 of the drawings the control source CS from which a warning or other signal is to be derived is shown as embodying a plurality of thermo-couples arranged in series, that is to say a chain of pairs of thermo-couples $5a$, $5b$, although of course only one pair of thermo-couples may be employed where a simple single control source is contemplated. By way of example in Figure 1 the chain of thermo-couples illustrated can be assumed as being assembled at various vulnerable points on an aircraft engine. The thermo-couple devices are of identical form throughout, each device having its pair of thermo-couples $5a$, $5b$ both exposed to the influence of normal ambient air conditions, but one ($5b$) being shrouded by shroud 5 and the other ($5a$) clear of the shroud, or more fully exposed, so that the latter will be affected first by the effect of a very sudden change in temperature, e.g. due to outbreak of fire. That is to say these thermo-couples are self-compensating at a normal or gradual rise of temperature and consequently under these conditions the output of one thermo-couple $5b$ cancels out the output of its mate $5a$.

In the event of flame, or an abnormal temperature rise, impinging on the exposed thermo-couple $5a$, the output of this thermo-couple will exceed that of the other, and the resultant E.M.F., i.e. the amount by which the exposed thermo-couple $pd$ exceeds that of the other is applied to the coil 7 of a milli-volt relay of switch M1, hereinafter referred to as a switch. The switch M1 is of the highly sensitive type, e.g. constructed as shown after the fashion of a milli-volt meter, in which the moving contact is a needle 2 held in engagement with a fixed contact 3 by a hair spring 4.

The application of the aforesaid low E.M.F. to the coil 7 of the switch overcomes the hair spring 4 and moves the needle contact 2 from the contact 3 into engagement with another fixed contact 6, and thereupon there is set into operation a miniature master relay which enables a normal source S, e.g. a 24 volt D.C. supply as used on aircraft, to actuate a warning device, such as the lamp L, or other suitable device which for its operation must consume more energy than is obtainable simply from the thermo-couples of the control source CS.

The miniature master relay is indicated at L5 with a winding 8 to control the movements of arms carrying contacts 12 and 13, and 21 and 22. Contacts 12 and 13, and also 21 and 22 are closed when the winding 8 is energised, and contacts 15 and 16 are closed to short out the relay L5 when the winding 14 of another miniature relay L4 is energised. The winding 8 is connected by lead 10 to the fixed contact 6 and to the negative or return of source S by lead 11, the positive connection to the winding 8 being via lead 10, contact 6, needle contact 2, resistor R1, lead $9b$ normally closed contacts 19, 20, lead $9c$, lead $9x$ and leads $9y$ to the positive of source S via resistor R3 and fuse A1, this circuit including a set of change over contacts $9a$ which are regularly opened and closed to introduce a pulsating supply to the needle contact 2 as hereinafter described.

There is only a momentary loading of the needle contact 2 from the source S at any time during the automatic operations of the apparatus, and this is due to the fact that when a warning is about to be given (or other apparatus brought into operation) by reason of the very low E.M.F. output from the thermo-couples upon the contact 2 moving over into engagement with contact 6, and the winding 8 of relay L5 being energised from the source S, the pair of contacts 12 and 13 acting as holding contacts are closed to transfer the electrical load from the contacts 2 and 6 to a holding circuit.

The said holding circuit comprises lead 13a from main positive lead 9 via the resistor R3 to contact 13, contact 12, lead 12a, winding 8 and return lead 11. The warning lamp L is brought into circuit by reason of the closing of the pair of contacts 21 and 22 operated in unison with contacts 12 and 13, the contact 21 being connected to the lead 9 and the contact 22 being connected by lead 22a to the lamp or other warning device L and via lead 30 to the return lead 11.

The value of the said resistor R3 in relation to the circuit as a whole is such that only a potential of say 8 volts is applied to the winding 8 to hold L5, the remaining volts say 16 volts of a twenty four volt supply S, being developed across the said limiting resistance R3 in the main lead 9.

Obviously, in switches of the milli-volt type the contact pressure is exceedingly light, hence as aforesaid, it is desirable to obtain a very positive engagement of the moving needle 2, with each of the contacts 3 and 6 at the moment of contact, and for this purpose the present invention provides means to implement the electrical energy overcoming the influence of the hair spring 4 at the moment when the contact 6 is engaged, and, in the reverse direction, to reduce the E.M.F. opposing the influence of the hair spring, so that in effect an assisting E.M.F. is introduced for both moments of contact in the circuit of the moving coil 7 in the correct direction to assist the maintenance of the milli-volt switch contacts until they have fulfilled the function of operating the master relay L5 or the releasing relay L4.

The said implementing E.M.F. is obtained from the source S by the introduction of the aforesaid resistor R1 in the operating circuit, which resistor, assuming we are dealing with a 24 volt source S, can have a value of 5 ohms, and can be fixed as shown, or it may be variable. The current flow, at the moment of engagement of the contacts 2 and 6 to the resistor R1 is split, part of it flowing through the resistor R1 and part of it through the thermo-couple chain via leads 28b, 28a to the moving coil 7 of the switch M1 which is already under the influence of the output of the thermo-couple which, of course, corresponds to the amount which output of 5a exceeds that of its mate 5b. As this implementing E.M.F. is in the correct direction i.e. in a positive direction through the coil 7 to assist the output of the thermo-couples, at the moment of engagement of the moving contact 2 with the fixed contact 6, the output of the thermo-couples and the consequent energy in the moving coil is increased by the amount introduced into the thermo-couple circuit from the normal supply source S. In this connection, it will be seen that the lead 9 from the normal supply source S is taken to one side of the thermo-couple chain, the resistance R1 being in series with the lead 9 from the normal source and the moving contact, and in parallel with the thermo-couple chain circuit and the coil 7 of the switch, i.e. a series-parallel connection.

It will be seen that as the said holding circuit is isolated from the pulsating circuit a constant warning light is given. However, if desired the lamp circuit can be broken intermittently via subsidiary contacts on the pulsating relay.

Connected across the said winding 8 of the relay L5 is a resistor R5 and a condenser C5 in series to suppress sparking on contacts 2 and 6 of switch M1. This said winding 8 of the relay L5 is effective for performing both functions of operating the relay and transferring the electrical load from the switch contacts 2 and 6 to the holding circuit aforesaid.

The moving contact 2 is now held against the contact 6 solely by the very low E.M.F. from the thermo-couple, but when the thermo-couple output is reduced to the normal state, i.e. the state appropriate to the moving contact 2 of the switch into engagement with the contact 3 aforesaid as e.g. when the flame previously causing the low E.M.F. output from the thermo-couple being extinguished, taking into consideration the influence of the switch spring 4 the lower contact 3 will be engaged by the contact 2, and this will bring into circuit the winding 14 of the release relay L4. The circuit now is from lead 9, contacts 57, 56 of a test relay L7 hereinafter described, lead 17, release winding 14, lead 16a, contacts 3 and 2, resistor R1 (in parallel with coil 7 and the thermo-couple chain), lead 9b, contacts 19, 20, lead 9c, lead 9x, pulsing contacts 9a, lead 9y, lead 13a, contacts 13 and 12, lead 12a, winding 8 and from thence to negative via lead 11. In this connection it should be mentioned that the moving contact 2, of the switch is now at a potential of, taking the aforesaid example of a 24 volt source S, sixteen volts with respect to positive of the source S, and the aforesaid holding winding 8 of the relay L5 has only 8 volts across it, whilst there are sixteen volts supplied to the winding 14 of release relay L4. This energises and causes relay L4 to operate and make its contacts 15 and 16 and thereby short circuit the winding of relay L5. The release of L5 causes the 16 volts to disappear by virtue of the opening of contacts 12 and 13, this resulting in the only electrical energy now flowing in the circuit being that normally generated by the thermo-couple. Condenser C4 and resistor R4 in series are in parallel with winding 14 of relay L4 to eliminate sparking.

As the operating winding 8 of the relay L5 is connected to full negative by lead 11 and is energised by a positive applied via the limiting resistor R3 (which may be of a value of 330 ohms), the moving contact 2 and contact 6 of the switch M1 during the initial operating period, and as that during the other or "release" period, the release winding 14 of the relay L4 is connected to positive by lead 17, and the moving contact 2 of the switch M1 is now at sixteen volts negative with respect to this positive due to the volts developed across the resistor R3 by virtue of its being in series with winding 8, it will be understood that the E.M.F. induced in the aforesaid series parallel circuit is, at the "release" period, in the reverse direction to that obtaining when the moving contact 2 and contact 6 engage.

The means for regularly making and breaking the circuit to the contact 2 and lead 10 to the winding 8, and lead 16a to the winding 14 comprises the pulse circuit containing the relays L1 and L2, this pulse circuit interrupting at regular and frequent intervals the operating supply in lead 9x via contacts 9a to the aforesaid relay L5 during operating stages, and to the aforesaid relay L4 during the release stage.

The pulsating relays L1 and L2 are connected across the twenty-four volt D.C. supply via resistors R6 and R7 which can have a value of 800 ohms each, the current being supplied from the continuous supply side of the lead 9 via choke winding L8 and resistor R6, lead 9d and 9j to negative via relay L2 and via resistor R7, load 9e to negative via coil or relay L1.

On the operation of relay L1 contacts l1 are opened and remove a short circuit (leads 9h, 9j) across the winding of relay L2, and L2 operates via positive on lead 9, choke L8, resistor R6, lead 9d, winding of relay L2 to negative lead 11. The operation of L2 closes contacts l2 which short circuits the winding of relay L1 via leads 9f and 9g, and L1 releases. The release of L1 short circuits L2 at contacts l1 and L2 releases removing the short circuit of L1 at l2 contacts which then re-operates and the sequence is repeated. By adopting short-circuiting methods of releasing the relays a distinctive lag is obtained due to the comparatively slow collapse of flux in a closed circuit, and electro-magnetic radiation and consequent radio interference is greatly reduced.

Two test buttons 18 and 18R are provided for the purpose of obtaining a ready indication that the apparatus is in working order, the test button 18 being on the casing containing the relays and associated elements already described, and the other 18R together with warning lamp L situated at a remote point, e.g. in the cockpit of an aircraft. These two test buttons are provided in association with the relay L7, the energising of which relay via lead 9, button contacts 18a, 18b and lead 31, coil of L7 to negative lead 11 following depression of the button 18 or 18R, opens contacts 19 and 20 and removes a short circuit from a resistance R2 in series parallel with the thermo-couple and coil 7 circuit. This introduces into the thermo-couple chain an E.M.F. equal to the warning output of the thermo-couples because the milli-volt switch side (i.e. point $r^2$) of the resistor R2 is connected to the negative supply (lead 11) via lead 11a through resistor R9 which can be of 5000 ohms and contacts 58 and 19 now closed, and the other end of resistor R2 is connected via 9x, contacts 9a lead 9y resistor R3 to positive. This introduction of the said E.M.F. in the thermo-couple chain and consequent excitation of coil 7 will cause the contact 2 to engage contact 6, and as already indicated, this will result in contacts 12 and 13 being closed and the transfer of the load to lead 13a and return lead 11, and the contacts 21 and 22 will connect lead 22a, lamp L to return 11.

A multiple-plug connector (plugs 23 and sockets 24) is provided for connecting up the relay apparatus to the warning lamp circuit and remote test button switch and the supply source S.

When the apparatus is to be adapted to a plurality of control points, the single warning lamp L and switch M1 will be substituted by a number of lamps and switches M1 and relays L4, L5 with associated circuits corresponding to the number of control sources. By way of example in Figure 2 four control sources are shown for two port and two starboard aircraft engines. However, as regards the pulsating circuit a relay L3 additional to relays L1, L2 is introduced, and each of these relays will actuate its own contacts 9a to cover three of the switch circuits, the fourth switch circuit being satisfied simply by adding to one of the relays, e.g. the relay L1 in Figure 2, a further set of change over contact 9a.

The various relays and switches are mounted in a chassis supported in turn by rubber dampers in a housing or on a base plate so that if the apparatus is subjected to vibration, the vibrations will be damped or absorbed by the rubber dampers.

With a multiple engine aircraft, e.g. four as shown in Figure 2, the contacts 56 and 57 of the test button on the set are substituted by fixed contacts 56a and 57a normally closed by the switch button 18 and likewise the remote test switch 18R has normally closed contacts 56b and 57b. The purpose of this is to avoid a complicated arrangement of relays and to maintain the single relay L7 common to e.g. the two port engine circuits and arising from this an auxiliary relay L7a introduced for the contacts 19 and 20 appropriate to the starboard engine circuits.

Independent fuses A2 are introduced into each circuit to obviate the risk of a defect in one circuit rendering the whole apparatus inoperable.

With reference to the pulsating contact 9a (Figure 1) or contacts 9a (Figure 2) it will be noticed that a change over form of contact is used. This is to obviate the risk of failure should the pulse cease to function during the fire warning operative condition.

Referring to the four engine arrangement shown in Figure 2, and taking for example the left hand one of the four circuits, it will be seen that this comprises milli-volt relay M1 which receives the detector head chain output via the upper pair of pins and associated sockets of the set 23 and 24 of the plug. When the thermo-couple output reaches fire warning level, the moving coil 7 of M1 will cause its moving contact 2 to reach the fixed contact 6. Upon the pulsing contacts 9a of relay L1 closing the circuit, current will start to flow as follows:

Positive supply via the plug, fuse A2, resistor R3 pulsing contacts 9a of relay L1, contacts 19 and 20 of the lowest shown relay L7, resistor R1, moving contact 2 of milli-volt relay M1, contact 6 of M1, the master relay L5, negative supply via pins of the plug connector. It can be seen that the chain of thermo-couples and moving coil 7 are in parallel with the resistor R1, and this initial flow of current will divide through this circuit, part flowing through the moving coil 7 in such a direction as to implement the original current generated by the chain of thermo-couples and thus exert pressure at the sensitive milli-volt relay contacts 2 and 6.

As soon as the master relay L5 operates, it will close its own hold contacts, re-routing the circuit as follows:

Positive supply from pin of the plug, fuse A2, resistor R3, hold contacts 12 and 13 of master relay L5, master relay coil L5 to negative supply on pins of the plug connector.

The master relay L5 will remain energised independent of the pulsing contacts 9a and the milli-volt relay contact 6 thus relieveing the latter of any electrical load. The warming lamp contacts 21 and 22 will be closed by virtue of the master relay operation and the lamp L illuminated.

When the fire has been extinguished the output from the chain of thermo-couples will fall to a safe level, allowing the contact 2 of the milli-volt relay to fall back and touch the contact 3. As the initial current starts to flow, the moving coil will receive an injected current as before but this time it will oppose the reduced current flowing from the thermo-couple chain and again, greater contact pressure will be exerted. The release relay L4 will operate as follows:

Positive supply from pin of the plug connector, fuse A1, contacts 56a, 57a of test button 18 of the set, pin of the plug connector, contacts 57a, 57b of remote test button 18R appropriate pin of the plug connector, coil of relay L4, contact 3 and contact 2 of milli-volt relay M1 and resistor R1, contacts 19 and 20 of test relay L7, pulsing contacts 9a on L1, hold contacts 12 and 13 of master relay L5, coil of relay L5 to negative supply via pins of the plug connector.

I claim:

1. Apparatus for giving a signal of a sudden change in temperature in, or in the vicinity of a power unit or other apparatus susceptible to variations in temperature range, comprising a very sensitive switch in the form of a moving coil relay having a pair of contacts one of which is engaged by a moving contact in the normal position of the switch and the other of which is engaged by said moving contact when said switch is actuated by energizing said moving coil, a thermo-couple type of detector for detecting the sudden change of temperature having a connection to said moving coil to energise it, a normal current source, a warning device electrically operable from said normal source, a first miniature relay and a second miniature relay independent operable and the first one of which comprises a master relay, a holding circuit for said first miniature relay fed from said normal source, a circuit for energizing said warning device which circuit is made and broken by said first miniature relay when energised and de-energised respectively, means operated by the second miniature relay when energised for releasing the first relay to effect deenergization of the warning device, a warning initiating circuit controlled by said holding circuit and comprising an electrical connection to said first miniature relay from that contact of said switch which is engaged by the moving contact when said moving coil is energized and an electrical connection from said moving contact to said normal source of electrical energy, pulsing means in said latter electrical connection producing only a momentary flow of current through said switch from said normal source during the bringing in of said holding circuit, a manually controlled test relay, a resistance in series parallel with the thermocouple and the coil of said switch, a pair of normally closed contacts on said test relay shorting said resistance and normally maintaining the connection through said normal source to the means actuating said moving contact of said switch, a further contact on said test relay and normally in open relationship with said latter contacts, a resistance of higher value than the preceding resistance connected between said last-named normally open contact and the normal source and brought in by making of said latter contact with one of said pair of normally closed contacts upon operation of said test relay thus reducing the voltage on the moving coil of said switch to approximately that of the output of the thermocouple, and a further pair of normally closed contacts on said test relay in series with the winding of said second miniature relay and said normal source and opened by energising of said test relay to isolate said second miniature relay from said normal source during testing.

2. Apparatus according to claim 1, wherein said thermocouple comprises at least one pair of separate oppositely poled thermocouple elements, one of which is exposed to the ambient temperature, the other element being shrouded to delay its response to changes in said ambient temperature.

3. Apparatus according to claim 1, further comprising a circuit connected between said moving coil of said switch and said normal source, said circuit being effective upon engagement of the moving contact of said switch with said other of said pair of contacts thereof to augment the current flow through said moving coil whereby the contact pressure between said moving contact and said other contact is increased.

4. Apparatus according to claim 3, wherein said last-named circuit is connected to said source through said pulsing means, whereby said increased contact pressure is periodically reduced.

References Cited in the file of this patent

UNITED STATES PATENTS

| | | |
|---|---|---|
| 2,278,939 | Mueher | Apr. 7, 1942 |
| 2,589,869 | Ruffle | Mar. 18, 1952 |

FOREIGN PATENTS

| | | |
|---|---|---|
| 687,136 | Great Britain | Feb. 11, 1953 |